United States Patent Office 3,354,624
Patented Nov. 28, 1967

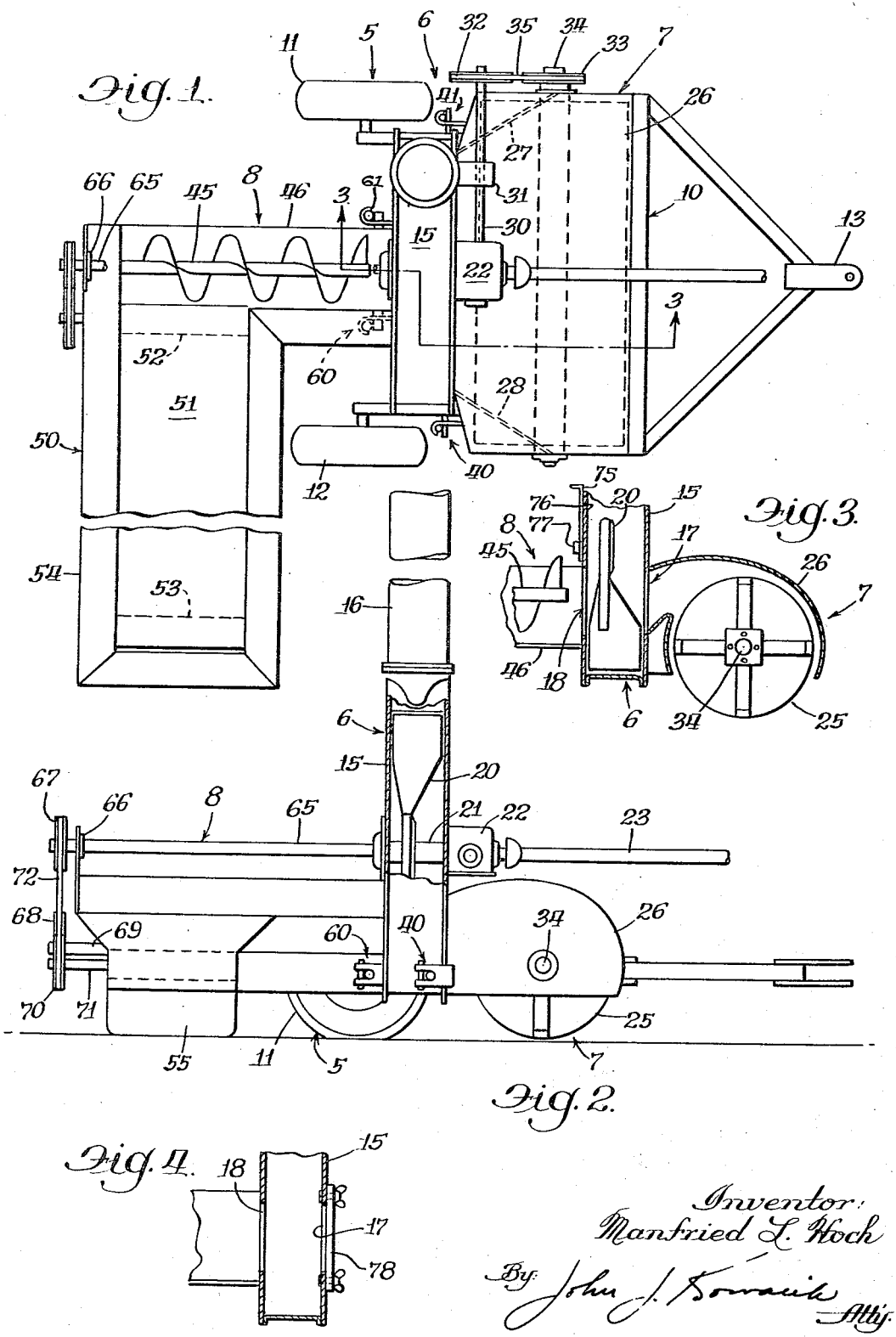

3,354,624
FORAGE CUTTING AND DEPOSITING APPARATUS
Manfried L. Hoch, Lockport, Ill., assignor to International Harvester Company, Chicago, Ill., a corporation of Delaware
Filed Feb. 1, 1965, Ser. No. 429,270
1 Claim. (Cl. 56—24)

ABSTRACT OF THE DISCLOSURE

A combined forage blower and crop harvesting and chopping device comprising a combined chopper and blower at one side of a blower and delivery thereto and a conveyor at the opposite side of the blower for conveying crops to the blower concurrently with operation of the chopper blower for augmenting the air supply to the blower.

---

This invention relates to forage cutting and depositing apparatus, and more particularly to apparatus which is utilized in part both in the field to cut forage and at another place to deposit cut forage in a storage facility such as a silo.

One object of the invention is to provide highly economical and effective apparatus that is capable of performing the several necessary functions incident to the process of harvesting forage. These functions are cutting the forage in the field, depositing the cut forage in an associated vehicle, receiving forage from a vehicle at another place and delivering same to a storage facility, usually at higher elevation than the apparatus and vehicle.

Another object is to provide apparatus including a trailer adapted to be attached to and moved by a powered vehicle such as a tractor or the like and a blower unit mounted on the trailer. The blower unit comprises a fan housing having at least one forage inlet opening, a delivering and depositing duct extending tangentially from the housing and a fan rotatably mounted within the housing.

Another object is to provide apparatus including the aforesaid trailer and associated blower unit, and a forage cutter assembly in effective relation with the trailer and blower unit. The forage cutter assembly either may be mounted on the trailer, or be readily detachable therefrom. The trailer, blower unit and forage cutter assembly are usable in the field to cut forage and deliver same to an associated vehicle.

Still another object is to provide apparatus including the aforesaid trailer, blower unit and forage cutter assembly, and a conveyor means adapted to be detachably connected to the trailer in communication with the blower unit. The trailer, blower unit and conveyor means are used at a place of storage for receiving cut forage in the conveyor means and depositing same in a storage facility.

The blower unit of the apparatus functions both in the field and at the storage place for depositing cut forage. In the first instance, freshly cut forage is received by the blower unit directly from the cutter assembly and deposited in an associated vehicle, and in the second instance cut forage is received by the conveyor means from a vehicle or other source, delivered by the conveyor means to the blower unit and deposited by the latter into a storage facility such as a silo.

A further object is to provide a harvester blower combination wherein the harvester components may be used to augment the action of the blower upon the blower feeding to excessive heights, the harvester developing a column of air fed through the blower.

Other objects, advantages and features of the invention will be apparent as the description proceeds, reference being had to the accompanying drawing wherein one form of the invention is shown. It is to be understood that the description and drawing are illustrative only, and that the scope of the invention is to be measured by the appended claim.

In the drawing:

FIGURE 1 is a top plan view of forage cutting and depositing apparatus embodying the invention, the various components of the apparatus shown in assembled relation.

FIGURE 2 is a side elevational view, partly broken away, of the apparatus shown in FIGURE 1, the foreground trailer wheel omitted for clarity.

FIGURE 3 is a fragmentary sectional view on line 3—3 of FIGURE 1.

FIGURE 4 is a fragmentary sectional view comparable to FIGURE 3 with the chopper removed.

Referring to the drawing, the forage cutting and depositing apparatus of the invention includes several main functional components, namely, a trailer 5, a blower unit 6, a forage cutter assembly 7 and a conveyor means 8. These functional components are shown in assembled relation in FIGS. 1 and 2.

By way of example, blower unit 6 is more or less permanently mounted on trailer 5, and forage cutter assembly 7 and conveyor means 8 are shown detachably related with trailer 5 and blower unit 6. It will be understood, however, that other arrangements are possible in the relationship between trailer 5, blower unit 6 and forage cutter 7.

The illustrated trailer 5 includes a conventional supporting frame generally designated 10, a pair of wheels 11 and 12 suitably mounted on frame 10 and a coupling 13 for attachment to a tractor or other powered vehicle (not shown).

Blower unit 6 includes a generally cylindrical housing 15, and in the form of the invention illustrated, fan housing 15 is mounted on frame 10 of trailer 5. As shown, housing 15 is vertically disposed and mounted transversely at the rear of trailer 5.

A forage delivering-depositing duct 16 extends tangentially from housing 15. As shown, duct 16 is vertical, but other axial directions may be used.

Housing 15 is provided with at least one forage inlet opening. In the illustrated form of the invention, two inlet openings are provided, namely, front opening 17 (FIG. 3) and rear opening 18. As will be seen later, front opening 17 receives freshly cut forage from cutter assembly 7, while rear opening 18 receives forage from conveyor means 8.

Blower unit 6 also includes a fan 20 (FIGS. 2 and 3) which is rotatably mounted within fan housing 15 and adapted to deliver forage entering either of the casing openings 17 or 18 to duct 16 with sufficient impetus to cause the forage and accompanying forced air to travel through duct 16 to a deposit point. Fan 20 has a suitably journaled shaft 21 leading to a gear box 22 mounted on the exterior of housing 15. Gear box 22 has a drive shaft 23 leading to a source of power such as a take-off from the motor of the powered vehicle with which the apparatus is used in the field. Gear box 22 thus constitutes a means for rotating fan 20 in counterclockwise direction, looking from the gear box.

Forage cutter assembly 7, as illustrated, includes cutting means in the form of a conventional flail chopper 25 that extends transversely of trailer 5 forwardly of blower unit 6. A downwardly opening housing 26 overlies flail chopper 25 and communicates rearwardly with front opening 17 of fan housing 15. As indicated in broken line in FIG. 1, lateral housing walls 27 and 28 converge toward inlet opening 17 of housing 15, thus directing the forage cut by flail chopper 25 toward opening 17. The draft created by fan 20 causes the cut forage to pass through opening 17 and enter the fan housing. With this arrangement, the need for an intermediate conveyor is obviated.

Referring to FIG. 1, a drive shaft 30 extends laterally from gear box 22, support for shaft 30 being provided by bearing block 31 secured to fan housing 15. A pulley 32 is provided at the free end of shaft 30 in alignment with a cooperating pulley 33 mounted on shaft 34 of flail chopper 25. A belt 35 extends around the pulleys 32 and 33, whereby flail chopper 25 is driven from gear box 22 in counterclockwise direction, looking toward FIG. 3.

As mentioned, cutter assembly 7 either may be mounted more or less permanently on trailer 5, or it may be detachable therefrom. If detachability is desired, coupling means 40 and 41 (FIG. 1) are provided on either side to detachably relate cutter assembly 7 with blower unit 6. These coupling means may be conventional.

Conveyor means 8 may take any convenient form suitable to perform the intended function. As illustrated, conveyor means 8 includes a screw conveyor 45 and associated through 46 that extend parallel to the axis of fan 20. As shown in FIG. 3, the forward end of screw conveyor 45 lies in effective relation with forage inlet opening 18 in the rear wall of fan housing 15. Thus, forage delivered by screw conveyor 45 passes through opening 18 into the fan casing for delivery through duct 19 and deposit at a storage place.

The illustrated conveyor means 8 also includes a transverse belt conveyor 50 comprising a conveyor belt 51 suitably mounted on rollers 52 and 53 within a trough 54. Belt conveyor 50 is of sufficient length to receive cut forage from the intended source without spilling, and both main parts of conveyor means 8 are supported from the ground by skid means 55 (FIG. 2).

As mentioned, conveyor means 8 is detachably related to blower unit 6. This relationship is established by detachable connecting means 60 and 61 (FIG. 1) located on opposite sides of trough 46 of screw conveyor 45 and on fan housing 15. These detachable connecting means may be conventional.

Referring to FIGS. 1 and 2, conveyor means 8 is driven from gear box 22 by means of a shaft 65 detachably related to and extending rearwardly from shaft 21 of fan 20. The rear end of shaft 65 is journaled in a bearing 66 carried by one of the conveyor troughs. A pulley 67 is mounted on the rear end of shaft 65 in alignment with a pulley 68 immediately below on the rear end of the shaft 69 of screw conveyor 45 and a pulley 70 on the shaft 71 of belt roller 52. A belt 72 encircles the three pulleys, thereby driving both conveyor screw 45 and conveyor belt 51 from gear box 22.

In operation, the apparatus excluding conveyor means 8 is used in the field to cut forage, first from the ground and then into proper length, and to deliver same to an associated trailing vehicle. The direction of rotation of the illustrated flail chopper 25 is such that the cut and recut forage is moved upwardly and rearwardly directly into fan housing 15 through front opening 17 therein. Blower unit 6 generates an air stream that suspends the cut forage, and both air and forage are propelled through duct 16, the forage being discharged to an associated vehicle.

With the conveyor 8 detached, the unit 7 is field operational and the rear opening 18 is closed by the closure plate 75 which slides along the rear wall 76 of housing 6 within guides 77.

At other times the apparatus is used to deliver cut forage to a storage place. For this function, conveyor means 8 is attached to blower means 6 with coupling means 60 and 61, and duct 16, or an addition thereto, is directed as desired. Previously cut forage is applied to conveyor belt 51 and transported thereby to screw conveyor 45. The latter delivers the forage to and through rear opening 18 of the fan housing 15, and fan 20 causes the forage to travel through duct 16 to the intended storage facility.

If additional windage or air is required, the unit 7 is left attached to housing 6 and rotor 25 is rotated to create an air blast through opening 17 to aid in moving the material delivered through opening 18. This would help to move material to exceptional heights into silos of current construction. If not required, a suitable closure plate 78 (FIG. 4) may be bolted across opening 17.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

A combination forage harvester and blower mechanism comprising a fan housing having upright walls and an intervening circumferential wall with a generally tangential crop outlet, an inlet opening in each wall communicating with the interior of the housing, a conveyor in delivering relation of material to one opening, a crop harvesting mechanism in delivering relation to the other opening including chopping and air generating means adapted in the attached position to the blower mechanism to introduce an air flow under pressure into the housing to augment the discharge of material from the housing through the outlet attendant to material being fed into the housing by said conveyor.

References Cited
UNITED STATES PATENTS

| | | | |
|---|---|---|---|
| 2,630,351 | 3/1953 | Hansen | 320—37 |
| 2,924,054 | 2/1960 | Myers | 56—24 |
| 2,955,403 | 10/1960 | McKee | 56—364 X |

ABRAHAM G. STONE, *Primary Examiner.*

P. A. RAZZANO, *Assistant Examiner.*